United States Patent

[11] 3,588,424

| [72] | Inventors | Herman J. Hammer |
| | | Brooklyn; |
| | | Sherman T. Heald, Willoughby; Frank A. |
| | | Royce, Euclid, Ohio |
| [21] | Appl. No. | 721,967 |
| [22] | Filed | Apr. 17, 1968 |
| [45] | Patented | June 28, 1971 |
| [73] | Assignee | Republic Steel Corporation |
| | | Cleveland, Ohio |

[54] METHOD AND APPARATUS FOR HIGH SPEED WELDING OF STAINLESS STEEL TUBE
9 Claims, 8 Drawing Figs.

[52] U.S. Cl............................................................ 219/8.5,
219/59, 219/74
[51] Int. Cl........................................................... H05b 1/00,
B23k 31/06
[50] Field of Search............................................ 219/8.5, 74,
59, 67

[56] References Cited
UNITED STATES PATENTS

| 3,072,771 | 1/1963 | Kennedy, Jr. | 219/59 |
| 2,528,758 | 11/1950 | King | 219/74X |
| 2,629,811 | 2/1953 | Cachat | 219/8.5X |
| 2,762,892 | 9/1956 | Park | 219/8.5 |
| 2,800,561 | 7/1957 | Shenk | 219/8.5 |
| 3,379,853 | 4/1968 | Domizi | 219/8.5 |

*Primary Examiner*—J. V. Truhe
*Assistant Examiner*—Hugh D. Jaeger
*Attorneys*—Robert P. Wright and Joseph W. Malleck ABSTRACT: Apparatus for forming seam welded stainless steel tube including a skelp forming mill, dies for forming the skelp into a tubelike configuration defining a welding V between advancing edges of the skelp, an induction heater for producing current flow along the edges of the skelp and around the V to heat portions of the skelp defining the V, a nozzle disposed adjacent the V and effective to direct at a high velocity a mixture of inert and reducing gasses onto the V. An internally cooled impeder is disposed within the skelp adjacent the V for restricting the area of the current path to maximize the heating effect produced by a given current flow.

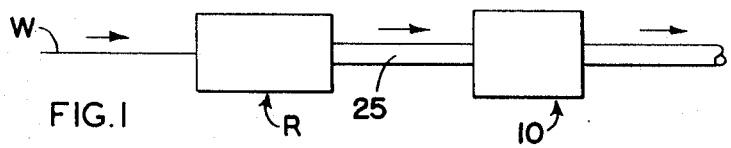
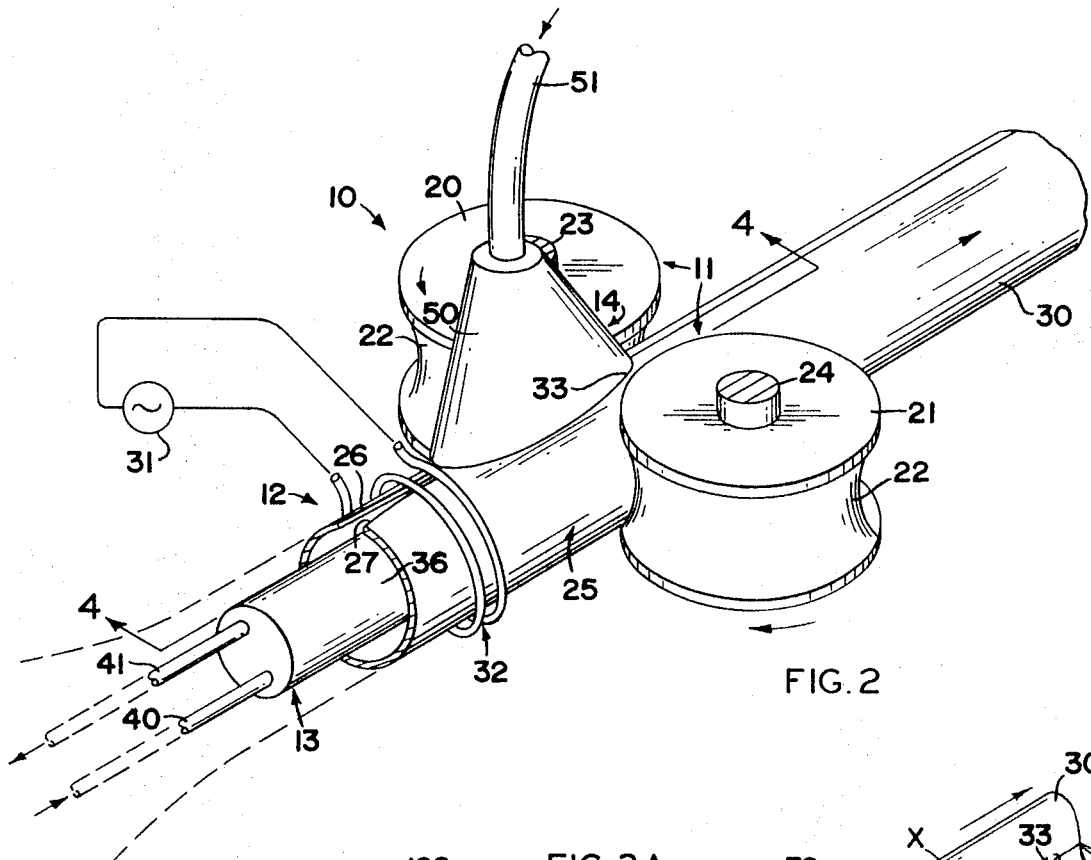
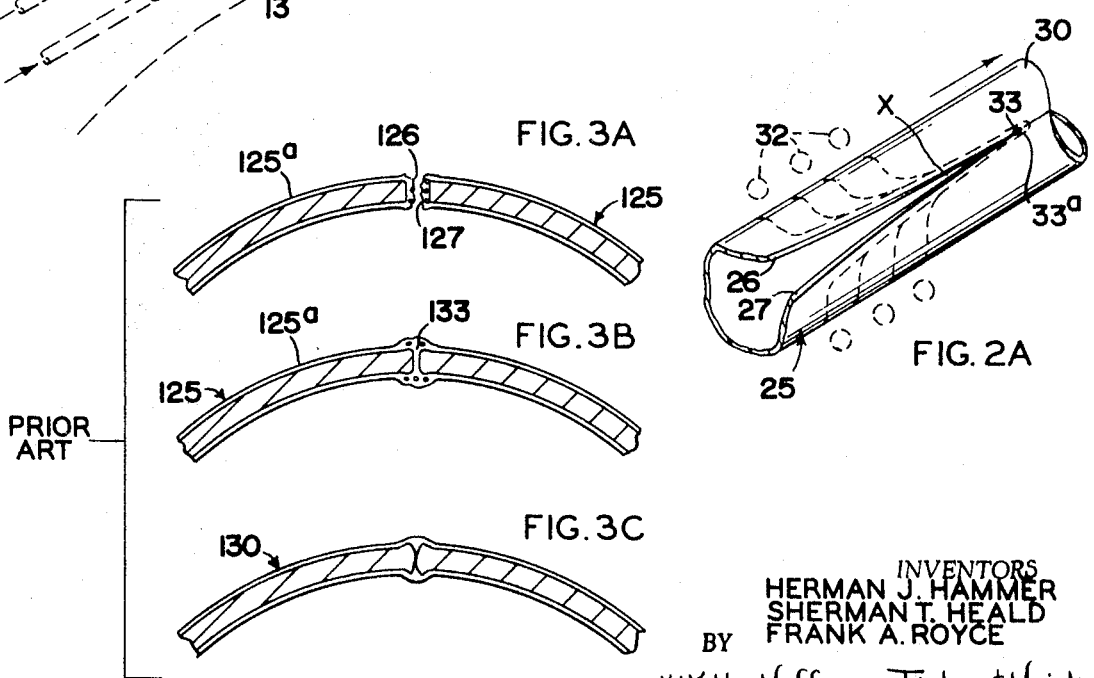

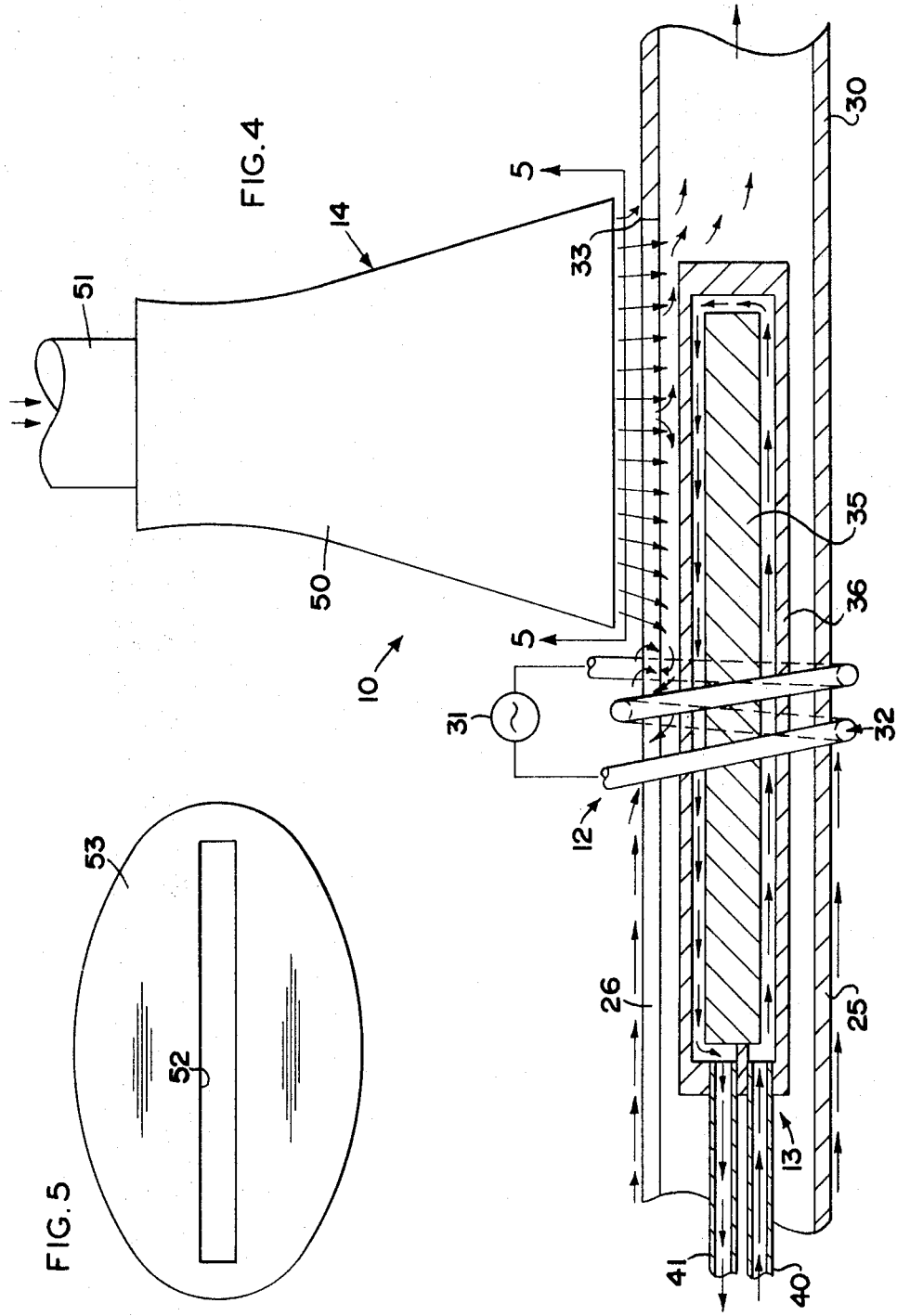

3,588,424

METHOD AND APPARATUS FOR HIGH SPEED WELDING OF STAINLESS STEEL TUBE

BACKGROUND OF THE INVENTION

1. Field of the Invention

The present invention relates to seam welding tubing and more particularly relates to high speed welding of stainless steel tubing.

Because of exceptional corrosion resistance and other properties of stainless steel tubing, it has enjoyed widespread use despite the high costs which result from the difficulties in fabrication.

There is a substantial demand for welded stainless steel tubing, particularly tubing with flawless welded seams but this demand has not been fully met. The demand has not been met because the difficulties in seam welding such tubing has limited its production rate and thus generated relatively high costs. More particularly, the prior art proposals for welding stainless steel tubing by radiofrequency power have not produced high quality welded stainless steel tubing.

The principal difficulty in welding at high speeds arises from the fact that exposed surfaces of stainless steel when heated to welding temperature become oxidized. Chrome oxides have been found to be formed on the heated skelp edges in the presence of eater or steam, oil and atmospheric air. The presence of these compounds adversely affects the consistency of welds. When abutting heated edges of the skelp are welded together, the oxides on the skelp form inclusions in the weld. These inclusions are randomly spaced along the weld and cause "pin hole" failures of the weld which result in progressive failure of the welding along the tube.

The principal reason for the existence of oxide inclusions in the weld is that the melting temperature of chrome oxides is several hundred degrees higher than the melting temperature of stainless steel. When the edges of the skelp are heated to welding temperature the surface oxides are maintained below their melting temperature and form an envelope about the heated steel. When the skelp edges are urged together and upset, the oxides form the noted inclusions within the weld. These inclusions tend to be planar and lie along the centerline of the weld.

Stainless steel tubing must comply with standard test specifications such as ASTM Standard Specification A 249. The procedure for performing this test involves flattening the stainless steel tubing. Where there are inclusions in the weld the tube will fail to meet specifications along the centerline of the weld. Heretofore, stainless steel tubing which has been welded at high speeds, i.e. 50 to 200 feet per minute, has not satisfied the test requirements because of random failures of the weld. These failures are often caused by oxide inclusions.

Failures are also traceable to instability of the puddle of molten metal at the welding Vee. When welding at high speeds the edges of the skelp tend to move relative to each other when approaching the welding Vee. This movement is known as "wavering." Even though wavering is slight and not readily visible, it is responsible for instability of the puddle. This instability often results in inconsistent or irregular loss of some molten metal from the puddle by spilling or splattering causing discontinuities or inclusions in the weld. Although waver cannot be readily eliminated, this invention is concerned with provision of a regular or consistent loss of molten metal from the puddle which may result from an inadequate puddle.

2. The Prior Art

Numerous attempts have been made to produce stainless steel tubing by means of high speed welding techniques. None of these attempts however, have resulted in tubing capable of consistently conforming to standard test specifications. Many of the prior art proposals have included the use of induction heating apparatus utilizing a heating coil disposed about the skelp or direct contact by sliding electrodes. The electric current thus induced in the skelp increases the temperature of the skelp edges. to the welding (and in most cases the melting) temperature by resistance heating. The heated skelp edges are then pressed together and upset to provide the welded seam.

In some proposals the upsetting and welding have been carried out in chemically quiescent inert atmospheres, e.g. in an atmosphere of argon gas, or the like, which shields the steel from oxidation by the surrounding air. Such proposals do not reduce the oxides already present and, more importantly, have not prevented formation of chrome oxides adjacent the welding Vee and removal of oxides from strip edges during high speed welding. Thus such proposals have not been effective to prevent "pin hole" failures.

The prior art has also proposed to include an "impeder" disposed centrally of the skelp adjacent the welding Vee. The impeder is designed to increase the amount of resistance heating of the skelp edges by restricting the current path.

The use of impeders limits heating to the skelp edges at the welding Vee. The impeder has necessarily been cooled by suitable fluid coolant, such as water, which is exhausted from the impeder into the welded tube. Such impeders have not been satisfactory in conjunction with high speed welding of stainless steel tubing. They have been unsatisfactory because among other reasons, water and water vapor at the weld Vee produce the oxides referred to previously.

Other prior art proposals for high speed welding have included the use of an oxygen free atmosphere at the welding Vee. This atmosphere includes a reducing gas, such as hydrogen, for chemically reducing the skelp oxides in an attempt to prevent discontinuities in the weld. The use of inert and reducing gases to produce a welding atmosphere have not been effective in welding at speeds of from 50 to 200 feet per minute.

SUMMARY OF THE INVENTION

It has been found that skelp approaching the welding Vee at a speed of 50 feet per minute or higher induces a flow of atmospheric air about the skelp. This flow is due to skin friction and is often of such momentum that it penetrates inert atmospheres in which welding takes place. This penetration causes oxidation of the heated metal at the welding Vee and inclusions result.

It has also been discovered that when radiofrequency induction heating is utilized the skelp must be kept free from water and oil in the vicinity of the welding Vee. The presence of these substances is another cause of discontinuities in a weld.

The use of an induction heating coil to provide for heating skelp edges limits the heated areas of the skelp to the edges in the immediate vicinity of the welding Vee. A high velocity stream of gas directed onto the heated areas of the edges protects the heated metal from oxide formation from atmospheric air without requiring a housing or the like for containing the nonoxidizing atmosphere.

When welding tube at high speed a puddle of molten metal forms at the vertex of the welding Vee. The high velocity gas stream impinging on the puddle stabilizes the puddle to reduce splattering or loss of part of the metal in the puddle. Stabilizing the puddle prevents discontinuities in the weld which would otherwise occur. When an induction coil is used to heat skelp edges the electric current in the edges adjacent the Vee flows in opposite directions and the inductance produced by the current encourages arcing between the skelp edges. This arcing is believed to be responsible, to at least some extent, for the weld defects. The high velocity gas flow across the adjacent skelp edges stabilizes arcs and thus reduces the possibility of defects from this source.

It has been further determined that, in addition to preventing formation of oxides, the oxide inclusions in the weld can be materially reduced by the combination of physical dislodgement of oxides prior to welding and the use of a reducing atmosphere applied in a manner which overcomes the inertia of the airflow.

In accordance with the present invention the skelp from which the tubing is welded is:

1. heated along the edges for a short distance adjacent the welding Vee;

2. provided with a nonoxidizing, and/or reducing, atmosphere which shields the heated skelp edges from atmospheric oxygen, stabilizes arcing, stabilizes the molten puddle at the welding Vee, and dislodges oxides from the skelp edges; and 3. protected from contacting water utilized in cooling welding equipment.

Gas shielding of the welding is of particular importance in welding tube according to the invention. The shielding atmosphere is directed in a relatively nonturbulent, high velocity stream. The stream is preferably an elongated narrow stream oriented with its longitudinal dimension generally paralleling the weld. The stream is directed radially of the skelp onto the heated edges of the skelp adjacent the Vee and across a puddle of molten steel formed at the Vee. The skelp is heated only along a relatively short distance from the vertex of the welding Vee toward the heater. The elongated flow of shielding gas is directed onto the Vee and the heated skelp edges so that additional shielding of the skelp is not required. The high speed gas flow stabilizes the puddle and scours heated skelp edges of surface oxides. In addition, the gas produces a shielding atmosphere about the welding which, due to the nonturbulent condition of the stream, minimizes entrainment of ambient atmospheric air into the stream. The high velocity stream also overcomes the momentum of the air carried along the skelp as noted previously.

The shielding gas may be an inert gas or a mixture of hydrogen and inert gas such as argon. Where hydrogen is used the weld is further improved by the reducing effect of the hydrogen upon the skelp oxides.

In a preferred form of the invention a coil is utilized to induce radiofrequency current in the skelp which produces resistance heating of the material near the welding Vee. An impeder restricts the path of the electrical current inducted in the skelp. The impeder is provided with an internal cooling flow of water which is directed away from contact with the skelp and tube so that water or water vapor from the impeder cannot react with the stainless steel.

In carrying out the present invention skelp is advanced through the heater coil at speeds between 50 and 200 feet per minute. An elongated nozzle is disposed adjacent the welding Vee to direct a high velocity nonturbulent flow of shielding gas across the puddle of molten steel and the heated edges of the skelp. The flow is directed radially inwardly of the skelp and elongated along the centerline of the skelp so as to shield the heated skelp edges and puddle. The velocity of the gas flow is preferably 8 feet per second or greater although somewhat less satisfactory results can be obtained using slightly lower velocities. Simultaneously with the induction heating and gas flow the skelp is fed through rollers which upset the adjacent edges at the welding Vee to weld the tube continuously along the longitudinally extending seam.

Accordingly a principal object of the present invention is the provision of new and improved method and apparatus for high speed welding of stainless steel tubing.

Other objects and advantages of the present invention will become apparent from the following detailed description made with reference to the accompanying drawings which form a part of the specification.

DESCRIPTION OF THE DRAWINGS

In the drawings:

FIG. 1 is a schematic illustration of equipment for forming and welding stainless steel tube at high speed;

FIG. 2 is a perspective view of a portion of the equipment of FIG. 1;

FIG. 2a is a fragmentary view of skelp advancing through the apparatus of FIG. 2 and illustrating electric current paths in the skelp;

FIGS. 3a—c are sectional views of a stainless steel workpiece at various stages of tube production according to the prior art;

FIG. 4 is a sectional view of the apparatus of FIG. 2 as seen from the plane indicated by the line 4–4 of FIG. 2; and FIG. 5 is a view of part of the apparatus of FIG. 4, as seen from the plane indicated by the line 5–5 of FIG. 4.

FIG. 1 illustrates equipment for forming and welding stainless steel tube from a sheet workpiece. The equipment includes a forming mill R for receiving a plane strip of material W, forming skelp therefrom, and feeding the skelp into seam welding apparatus or welder 10. Seam welded stainless steel tubing emerges continuously and at high speeds from the welder 10.

The welder 10 includes (FIG. 2) an upsetting die 11, induction heating equipment, schematically shown at 12, an impeder 13, and a gas directing structure 14. The upsetting die 11 includes rolls 20, 21 which are disposed for rotation about parallel axes. Each of the rolls includes an annular, convex groove 22 at its periphery. In cross section each groove 22 defines a segment of a circle. The rolls 20, 21 are supported by shafts 23, 24 which maintain the rolls 20, 21 in the positions illustrated in FIG. 1 so that the grooves 22 are urged into pressure engagement with an advancing length of stainless steel skelp 25.

The skelp 25 is defined by a strip or sheet of stainless steel material which is fed from the mill R in an elongated generally cylindrical form. The skelp 25 has edges 26, 27 disposed adjacent each other. These edges are heated, as is described presently, as the skelp advances to the rolls. The pressure relationship between the rolls 20, 21 and the skelp 25 urges the heated skelp edges 26, 27 into welding engagement between the rolls. In this manner a cylindrical tube 30 of stainless steel material is formed.

The illustrated induction heater 12, includes a radiofrequency generator 31 and a coil around the skelp. The generator 31, (schematically shown), produces RF voltage of approximately 450 kiloHertz, or kilocycles, across the coil 32. The RF voltage across the coil 32 induces current flow in the skelp 25 as is shown in broken lines in FIG. 2a.

The induced current flows around the skelp 25 in relatively wide band except adjacent the edges 26, 27 where the current flow is channeled along relatively narrow paths. The induced current flow along the edge 26 is in the opposite direction from the current flow along the edge 27. Magnetic fields produced by the current flow restrict the current paths to narrow areas along the surfaces of the edges 26, 27. Resistance heating of the material at these surfaces rapidly increases the temperature of the stainless steel material along the edges 26, 27 to its melting temperature. Because of the large area through which current flows in the skelp adjacent the coil, the skelp moving through the coil is substantially unheated. As seen in FIG. 2a the current induced in the skelp is concentrated into narrow flow paths "downstream" of the coil. The temperature of the edges approximately at the location X of FIG. 2a is sufficiently high to render the stainless steel susceptible to rapid oxidation.

The metal forming the edges 26, 27 of the skelp is heated to the welding temperature as it proceeds from the coil 32 to a Vee 33 formed by the edges 26, 27 as they are urged together by the die 11. As the edges 26, 27 are urged together at the Vee 33 by the upsetting die 11, the molten edges are welded together to define the tube 30. A puddle 33a of molten stainless steel is formed at the welding Vee 33. The puddle is maintained substantially stationary at the Vee with molten metal continuously flowing from the puddle into the weld and heated metal being continuously introduced into the puddle from the skelp edges. Thus the puddle has a substantially constant volume.

Due to irregularities in the skelp edges as well as to deflection of the skelp by the rollers 20, 21, the skelp edges move relative to each other at the Vee. This relative movement known as "wavering" is not generally visible to the observer but results in instability of the puddle which is exhibited as an explosion or popping of the puddle which results in a void or weld defect. This is better understood if the puddle is visualized as a membrane which is being stretched between the welding Vee; this puddle is under a very intense alternating field and it will act much in the nature of an armature of a motor with a tendency to move. Should this puddle or membrane move or be stretched irradically, the spilling over or splatter might be excessive resulting in the aforesaid explosion or popping. It is desired that a regular or a continuous spilling over be provided.

The impeder 13 is disposed centrally in the skelp 25. The impeder extends from a location slightly ahead, or "upstream," of the welding Vee 33 beyond the induction coil 32. The impeder 13 has magnetic properties which serve to restrict the current flow adjacent the edges 26, 27 to smaller volumes than the current would otherwise flow through. This restriction of the current flow maximizes the resistance heating of the edges 26, 27 for a given amount of current.

The impeder 13 includes a magnetic core element 35, purpose. 4. The core element 35 is of a ceramic material supported within a manifoldlike housing 36. The ceramic core is a ferromagnetic material which becomes paramagnetic at elevated temperatures. Due to the proximity of the core 35 and housing 36 to the welding Vee 33 and heated edges 26, 27, the impeder 13 is subjected to substantial radiation and induced heating. In order to maintain the ferromagnetic properties of the core it must be cooled continuously during operation of the welding 10. A supply of cooling water is continuously circulated within the housing 36 about the core 35 for this purpose.

In accordance with the preferred construction of the welder 10 the flow of cooling water to the impeder 13 is provided through a tubular supply conduit 40 from a suitable water supply. The water exists from the housing 36 through a return conduit 41 so that the water coolant for the impeder is prevented from contacting the skelp 25 and tube 30. This construction eliminates the possibility of oxides being formed as a result of water or water vapor contacting the scalp.

FIGS. 3a—c illustrate a prior art welded stainless steel tube at various stages in its production. FIG. 3a is a fragmentary cross section of skelp 125 showing an inherent oxide coating 125a. The coating 125a is greatly exaggerated for purposes of illustration. The oxide coating 125a extends completely about the exposed heated surfaces of the skelp 125 including edges 126, 127.

In addition to the usual "skin" 125a of oxides, the skelp edges 126, 127, at locations which are heated to temperatures suitable for welding, carry heavy layers of chrome oxides or the like 125b. These oxides are formed by exposure of the heated skelp to atmospheric oxygen, water or water vapor, and have melting temperatures substantially above the melting temperature of stainless steel. When the steel adjacent the edges 126, 127 is increased to its welding temperature the chrome oxides covering the material remain in a solid-state as illustrated in FIG. 3a. Since the stainless steel at the edges is in or near the melting temperature the temperature is stabilized below the melting temperature of the oxides. Consequently the oxides "float" and envelope the molten stainless steel adjacent the edges 126, 127.

FIG. 3b illustrates the relationship between the edges 126, 127 at welding Vee 133. The edges 126, 127 are being deformed by the upsetting rolls 120, 121 and the oxides between the edges 126, 127 remain substantially intact. When the oxides are moved into the welding Vee they tend to form globules due to surface tension and these globules are compressed between the edges at the Vee forming discontinuities in the welded seam.

FIG. 3c illustrates the welded seam of the tube 130. It is apparent from the FIG. that the oxides are distributed in a planar array longitudinally along the weld between the adjoining edges of what formerly was the skelp. When such a tube is flattened the weld fails longitudinally of the tube along the plane of the included oxides.

Referring again to FIG. 2, and in accordance with the present invention, the gas directing device 14 is connected to a suitable supply of pressurized nonoxidizing gas, not shown, by a supply conduit 51. A flow of shielding gas is directed across the edges 26, 27 and the welding Vee 33 during operation of the welder 10.

The gas flowing over the molten material adjacent the welding Vee is preferably primarily comprised of an inert substance such as argon gas so that the molten metal adjacent the welding Vee is shielded from atmospheric oxygen during the welding process. In the preferred embodiment the shielding gas additionally includes hydrogen which reacts chemically with oxides on the surface of the stainless material and reduces the oxides by removing oxygen therefrom. The use of hydrogen in the shielding gas contributes materially to the smoothness of the weld bead and accordingly is preferred.

The device 14 includes a manifoldlike nozzle 50 connected to the supply conduit 51. The nozzle 50 has an elongate generally rectangular orifice 52 formed in a base surface 53, FIG. 5. The base 53 of the nozzle 50 is disposed in a plane which extends parallel to the axis of the tube 30. The orifice 52 is preferably disposed in the base 53 so that the shielding gas is directed vertically downwardly toward the axis of the tube. The orifice is an elongated opening which extends along the axis of the tube so that the shielding gas flows onto and across the welding Vee 33 and puddle 33a as well as the heated edges 26, 27 between the locating X (FIG. 2a) and the Vee. Typically the orifice 52 is approximately 2 inches in length and one-quarter of an inch wide and is positioned as close as is practical to the skelp adjacent the welding Vee.

The shielding gas is supplied to the manifold 50 at a rate of about 100 cubic feet per hour and produces a velocity through the orifice 52 of from approximately 480 feet per minute of 720 feet per minute, at atmospheric pressure. The noted gas velocities (8—12 feet per second) or higher are believed essential in producing substantially defect free welding. Stainless steel tubing has been produced using the described apparatus with the gas velocity ranging from 4—6 feet per second but the resulting welding tube is not consistent in that the number of test failures of the weld is materially increased even though this total is not large compared to the prior art construction. Accordingly gas velocities of at least 8 feet per second are recommended.

The length of the orifice 52 permits a flow of shielding gas over the complete length of the heated skelp edges and the welding Vee. Due to localized heating of the skelp, no additional protective atmosphere is needed. In addition to shielding the heated skelp edges against oxidizing the high velocity of the shielding gas impinging on the molten edges of the skelp tends to scour the edges to dislodge the oxides or other solids materials. The surface of the puddle 33a is formed at the welding Vee and the surface of this puddle is also scoured by the shielding gas. It is to be appreciated that when gaseous hydrogen is a constituent of the shielding gas, oxides not dislodged from the skelp are reduced as noted previously. Furthermore the gas flow adjacent the Vee stabilizes any arcs which may be struck between the skelp edges.

In addition to the foregoing functions of the high velocity gas flow, the gas impinging on the surface of the puddle 33a stabilizes the puddle to maintain a uniform size. Essentially the gas impinging on the puddle dampens wavelike disturbances in the puddle caused by vibrations of the skelp edges.

The configuration of the orifice 52 provides a nonturbulent flow of the shielding gas onto the heated stainless steel. The nonturbulent characteristic of the gas flow prevents any substantial entrainment of atmospheric air which might otherwise occur if the shielding gas were directed onto the molten material in a turbulent stream.

As noted previously atmospheric air is picked up by the moving skelp due to skin friction and a surrounding layer of atmospheric air is moved with the skelp toward the upsetting die 11. The momentum of the atmospheric air carried along with the skelp is of such magnitude that air can penetrate a relatively stagnant shielding atmosphere, such as proposed by the prior art, and cause oxidation of the molten surfaces near the welding Vee. A high velocity stream of shielding gas in accordance with the invention has a large momentum which overcomes the momentum of air carried by the skelp. The air carried by the skelp adjacent the edges 26, 27 is therefore scattered and does not approach the welding Vee or the molten edges of the skelp.

The nozzle 50 is preferably disposed to direct the gas onto the skelp along the plane of the welded seam and normal to the tube axis. However, if necessary, the nozzle can be disposed to direct gas onto the skelp at angles of as much as 45° to the plane of the weld. Additionally the nozzle can be tilted to direct the gas opposite the direction of pipe travel at an angle of 15° from normal to the tube axis.

Thus, a welder 10 constructed in accordance with the present invention permits high speed welding of stainless steel tubing by shielding heated skelp edges adjacent the welding Vee to prevent oxide formation; reducing oxides on the molten metal; preventing entrance of atmospheric oxygen into the vicinity of the welding; and stabilizing the puddle of molten metal at the Vee. Continuous high speed welding of stainless steel tubing is thus effected in which the welds are of high quality and tubes welded in accordance with the invention are more than adequate to meet standard test specifications for such tubing.

Although the invention has been described in its preferred form with a certain degree of particularity, it is understood that the present disclosure of the preferred form has been made only by way of example and that numerous changes in the details of construction and the arrangement of parts may be restored to without departing from the spirit and the scope of the invention as hereinafter claimed.

We claim:

1. A method of making stainless steel tube comprising the steps of:
   a. forming skelp from a sheet of stainless steel material;
   b. directing said skelp along a path of travel at a speed of at least 50 feet per minute;
   c. urging edges of the skelp together at a location on the path of travel;
   d. resistance heating the skelp at said location and along edges adjacent said location by high frequency electrical energy; and,
   e. directing a flow of nonoxidizing gas onto the heated edges and said location at velocities of at least 8 feet per second to shield said heated edges from the atmosphere.

2. A method as defined in claim 1 wherein said steps of urging the skelp edges together and heating the skelp edges produce a puddle of molten metal at said location, and said directing step further includes the step of directing said gas onto said puddle to stabilize said puddle.

3. A method as defined in claim 1 wherein said heating step includes inducing a radiofrequency current in said skelp along said edges.

4. A method of making stainless steel tube comprising the steps of:
   a. continuously forming a sheet of stainless steel into a generally tubular shape by advancing stainless steel skelp along a path of travel at an advancing speed of at least about 50 feet per minute and urging edges of the skelp together at a location on said path of travel;
   b. heating portions of said skelp along closely spaced edges thereof and at said location by inducing radiofrequency electric current in said edges and said location; and,
   c. directing a stream of nonoxidizing gas onto the heated edges and said location to shield said portions;
   d. said nonoxidizing gas stream having a velocity of at least about 8 feet per second and being sufficiently nonturbulent that entrainment of gas ambient said stream is minimal.

5. A method as defined in claim 4 wherein said directing step includes the step of directing said gas onto said edges in a direction substantially transverse to the axis of said skelp.

6. A method as defined in claim 4 and further including the step of mixing a reducing gas with an inert gas to produce said nonoxidizing gas and reducing oxides along said heated edges while shielding said edges.

7. A method as defined in claim 4 and further including the steps of providing magnetic means, magnetically restricting the current path to increase resistance heating for a given current flow, and cooling said magnetic means by a flow of water which is isolated from said skelp.

8. The method as defined in claim 4 wherein the product of the mass and velocity of said nonoxidizing gas flow is greater than the product of the mass and velocity of atmospheric air carried along said advancing skelp whereby said gas stream prevents said atmospheric air form contacting said heated edges.

9. In a method of continuously producing welded stainless steel articles free from minute weld defects, the steps comprising:
   a. advancing a continuous supply of stainless steel material in a converging manner at an advancing speed of at least 50 feet per minute to bring opposed edges of said material into close proximity and ultimate contact;
   b. inducing a radiofrequency current in said opposed edges closely adjacent said contact to form a flux path along said edges and through said contact;
   c. maintaining a stable high flux density throughout said path whereby said material is heated to welding temperature at least at said contact; and
   d. directing a jet of nonoxidizing gas at said material edges and said contact only along and through said flux path at a flow rate of at least 8 feet per second.

PO-1050
(5/69)

UNITED STATES PATENT OFFICE
CERTIFICATE OF CORRECTION

Patent No. 3,588,424      Dated June 28, 1971

Inventor(s) Herman J. Hammer -and- Sherman T. Heald -and- Frank A. Royce

It is certified that error appears in the above-identified patent and that said Letters Patent are hereby corrected as shown below:

Column 1, line 26, "eater" should be "water";

Column 1, line 32, "welding" should be "weld";

Column 4, line 10, "plane" should be "planar";

Column 5, line 20, "purpose." should be "FIGURE";

Column 5, line 22, "manifoldlike" should be "manifold like";

Column 5, line 39, "scalp" should be "skelp";

Column 6, line 17, "manifoldlike" should be "manifold like";

Column 6, line 33, "of" should be "to";

Column 6, line 50, "solids" should be "solid".

Signed and sealed this 28th day of December 1971.

(SEAL)
Attest:

EDWARD M. FLETCHER, JR.
Attesting Officer

ROBERT GOTTSCHALK
Acting Commissioner of Patents